(12) United States Patent
Brown et al.

(10) Patent No.: US 7,454,526 B2
(45) Date of Patent: Nov. 18, 2008

(54) METHOD AND SYSTEM FOR PROVIDING BROWSER FUNCTIONS ON A WEB PAGE FOR CLIENT-SPECIFIC ACCESSIBILITY

(75) Inventors: Frances C. Brown, Austin, TX (US); Susan Crayne, Hartsdale, NY (US); Samuel R. Detweiler, Austin, TX (US); Peter Gustav Fairweather, Yorktown Heights, NY (US); Vicki Lynne Hanson, Chappaqua, NY (US); Richard Scott Schwerdtfeger, Round Rock, TX (US); Beth Rush Tibbitts, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 11/203,831

(22) Filed: Aug. 13, 2005

(65) Prior Publication Data
US 2006/0031759 A1 Feb. 9, 2006

Related U.S. Application Data

(62) Division of application No. 09/961,938, filed on Sep. 24, 2001, now Pat. No. 7,010,581.

(51) Int. Cl.
*G06F 3/00* (2006.01)
*G06F 15/16* (2006.01)
(52) U.S. Cl. ..................... 709/246; 715/729
(58) Field of Classification Search .............. 709/246
See application file for complete search history.

(56) References Cited

U.S. PATENT DOCUMENTS

| 6,247,050 B1 * | 6/2001 | Tso et al. ............... 709/224 |
| 6,421,733 B1 * | 7/2002 | Tso et al. ............... 709/246 |
| 6,662,218 B2 * | 12/2003 | Mighdoll et al. ........ 709/219 |

(Continued)

OTHER PUBLICATIONS

Harini Bharadvaj et al., An Active Transcoding Proxy to Support Mobile Web Access, 17th IEEE Symposium on Reliable Distributed Systems, Oct. 1998, 6 pages.*

(Continued)

*Primary Examiner*—Patrice Winder
(74) *Attorney, Agent, or Firm*—Diana R. Gerhardt; Dillon & Yudell LLP

(57) ABSTRACT

A method and system that provide browser-based functions by injected into a web page a control button, form text field or similar browser-based function control such that both the browser controls and the content of the web page can be transformed for accessibility. A proxy machine retrieves a web page for a user, and then injects the user selected browser function controls into the web page itself. The injected browser controls are supported by web-based application services, preferably resident in an intermediary proxy machine, for producing web content that is representative of that function. The web page is transformed into a style that is accessible for that particular user, such as magnifying the page, reformatting background schemes, etc. The user can select which browser function buttons are injected into the web page, and as the web page is transformed for accessibility, the browser controls on the page are likewise transformed.

5 Claims, 4 Drawing Sheets

U.S. PATENT DOCUMENTS

| | | | |
|---|---|---|---|
| 6,665,642 B2 * | 12/2003 | Kanevsky et al. | 704/260 |
| 6,925,595 B1 * | 8/2005 | Whitledge et al. | 715/513 |
| 6,993,559 B2 * | 1/2006 | Jilk et al. | 709/206 |
| 2002/0007379 A1 * | 1/2002 | Wang et al. | 707/515 |
| 2002/0054090 A1 * | 5/2002 | Silva et al. | 345/747 |

OTHER PUBLICATIONS

Rakesh Mohan et al., Adapting Multimedia Internet Content for Universal Access, IEEE Transactions on Multimedia, vol. 1, No. 1, Mar. 1999, pp. 104-114.*

* cited by examiner

METHOD AND SYSTEM FOR PROVIDING BROWSER FUNCTIONS ON A WEB PAGE FOR CLIENT-SPECIFIC ACCESSIBILITY

This is a divisional of U.S. patent application Ser. No. 09/961,938, now U.S. Pat. No. 7,010,581 B2, filed on Sep. 24, 2001 and titled 'Method and System for Providing Browser Function of a Web Page for Client-Specific Accessibility.'

CROSS-REFERENCE TO RELATED APPLICATIONS

The present application is related to the following application, which is filed on even date herewith and incorporated herein by reference:

U.S. patent application Ser. No. 09/962,000, now U.S. Pat. No. 6,970,918.

BACKGROUND OF THE INVENTION

1. Technical Field

The present invention relates in general to the field of computer networks, and, in particular, to the connection between a user device and a content server. Still more particularly, the present invention relates to an improved method and system for providing browser based functions in a web page to provide accessibility to that web page to a disabled client user.

2. Description of the Related Art

The Internet comprises a vast network of heterogenous computers and sub-networks all communicating together to allow for global exchange of information. The World Wide Web (WWW) is one of the more popular information services on the Internet. The WWW uses browser software to decipher HyperText links to other documents or files located on remote computers, all of which are connected to the Internet. Browsers provide a user-friendly interface that allows users to easily navigate from site to site or file to file around the Internet. Using a browser, a user can access information in the form of text, audio, video, still pictures and related multimedia stored on remote computers or content servers.

FIG. 1 is a block diagram of the Internet and other devices that may be used to access the Internet. A client device 10, such as a desktop computer, laptop computer, personal digital assistant (PDA), onboard vehicle computer, cellular telephone, etc., sends a request for a Web site, typically through a browser application program using HyperText Transfer Protocol (HTTP) to send the request through an Internet Service Provider (ISP) 12. ISP 12 establishes a link to an Internet 14, which then passes the HTTP request to a content server 16. This request is forwarded to a content provider 18 that is typically a web page addressed by a Uniform Resource Indicator (URI) such as a Uniform Resource Locator (URL).

The response from client device 16 is typically in the language of HyperText Markup Language (HTML), which is the standard language for generating documents on the World Wide Web (WWW). HTML defines the structure and layout of a web document by using a variety of tag commands inserted in the document to specify how the document, or portion of the document, should be formatted. The response from content provider 18 is routed back through content server 16, Internet 14, and ISP 12 to client device 10.

A major problem for the Internet relates to providing access to web pages to handicapped users, including the visually impaired, hearing impaired and physically handicapped. Such accessibility primarily consists of transforming the style of information received from a web page, such as changing print font sizes or converting written text to aural speech for the visually impaired. While some content servers 16 have transcoding functions, these are typically limited to select content providers 18 served by that content serer 16. While the content web page may be transformed by the content provider 18, the function buttons of the browser on the client device 10 remain outside the viewed web page, and therefore are not transformed. For example, while the web page may be magnified so that a user with limited vision can see the content of the page, the control buttons in the frame around the view web page remains unmagnified, and so the user is still unable to see these browser control buttons. Magnifying all browser buttons is not practical due to space limitations on the viewing screen.

Another problem found in accessibility prior art relates to the process of transcoding content from content provider 18 to a format that is recognizable by the hardware/software of a particular client device 10. Typically, a response from a web page is conventionally formatted via standard page description language such as HTML, which contains text and can reference graphics, sound, animation and video data. If client device 10 is a pervasive device, such as a PDA, smart phone, wearable computer, etc., it typically must communicate in a non-HTML language, and usually through a dedicated ISP 12. The dedicated ISP 12 directs the request from the pervasive device to a special URL, typically sub-defined by content server 16 or content provider 18, to reply with the appropriate response in the appropriate language, such as Wireless Application Protocol (WAP) for handheld wireless devices such as mobile phones, pagers, two-way radios, smart phones and communicators. Alternatively, ISP 12 may have the ability to transcode an HTML response from a content provider 18, but this ability has historically been limited to a limited predefined number of content providers. Thus accessibility requires not only transcoding of content by changing font size, background color, etc. for a particular handicapped user, the transcoded content needs to be understandable by the particular type of client device 10 being used.

It should therefore be apparent that there exists a need for a means and method of providing browser-based function control buttons, form text fields and other browser-based functions integral with a content web page, such that both the browser controls and the web page can be transformed and manipulated together for accessibility. These browser functions may include, but are not limited to, forward, back, page reload, user settings, bookmarks and history list. Such a system should also include the ability to transcode the content into a format readable by different client devices 10 that the user may use. It would further be desirable to devise a computer product wherein such a method may be performed on a computer system. In addition, it would be desirable to devise a proxy machine having the ability to provide these transformation applications and optionally transcode responses from a content provider 18 to a client device 10 according to user-defined preferences for accessibility.

SUMMARY OF THE INVENTION

The present invention a method and system that provide browser-based functions by injected into a web page a control button, form text field or similar browser-based function control such that both the browser controls and the content of the web page can be transformed for accessibility. A proxy machine retrieves a web page for a user, and then injects the user selected browser function controls into the web page itself. The injected browser controls are supported by web-based application services, preferably resident in an intermediary proxy machine, for producing web content that is representative of that function. The web page is transformed into a style that is accessible for that particular user, such as magnifying the page, reformatting background schemes, etc. The user can select which browser function buttons are injected into the web page, and as the web page is transformed for accessibility, the browser controls on the page are likewise transformed. The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, fixer objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
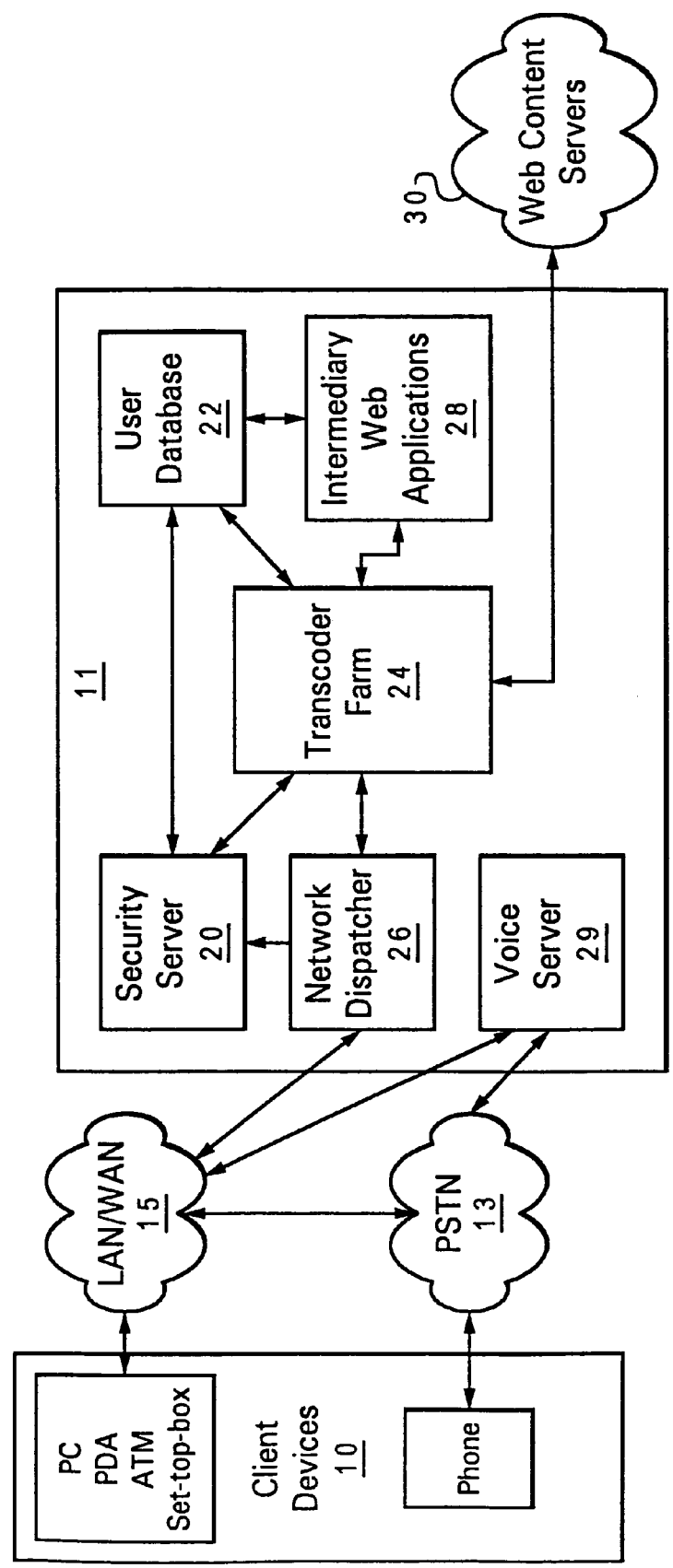
FIG. 2 illustrates a simplified block diagram of an Internet connection using an intermediary server for transcoding content.

With reference now to FIG. 2 there is depicted a block diagram of a preferred Internet connection between client device 10 and web content server 30. Client device 10 may be a network connected device connected through a Local Area Network (LAN) or Wide Area Network (WAN), which LAN/WAN 15 connects directly to proxy machine 11. Such devices may be a desk computer, laptop computer, set top box, PDA, Automated Teller Machine (ATM), or computer kiosk. In addition, client device 10 may be a cellular telephone, which typically is connected through a Public Switched Telephone Network PSTN 13 that connects the cellular telephone to the proxy machine 11, either directly or via LAN/WAN 15.

Figure 1:
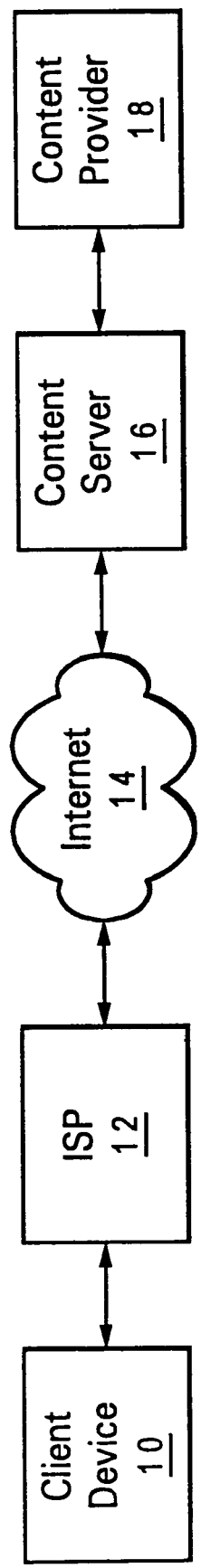
FIG. 1 depicts a simplified block diagram of prior art Internet connections.

As shown in FIG. 2, in the preferred embodiment proxy machine 11 performs several functions. Proxy machine 11 connects client device 10, as described above, to Web content servers 30, which may be an Internet service (ISP), Internet Content Provider (ICP), or other similar gate way devices. Proxy machine 11 acts as a proxy between client device 10 and Web content server 30, which provides content from content provider 18, shown in FIG. 1. Access to proxy machine 11 may be through a direct or network connection, and may be staged using different communication medium. For example, a telephone may first require transmission through PSTN 13 to a voice server 29. Requests entering proxy machine 11 are routed, for load balancing through network dispatcher 26. After routing has been determined, the requests are passed to one or more designated transcodes in a transcoder farm 24. User identification information is passed in the request and authenticated by a security server 20 based on the stored user set of protocol. If the user is not known or invalid, proxy machine 11 will direct the client device's user agent (browser) to authenticate the user by prompting it for a user I.D. and password. The authentication information is then be passed to proxy machine 11.

Once a user has been validated, the designated transcoder will query user data base 22 for profile information. In the preferred embodiment, this profile information is delivered through an extensible markup language (XML) transcoding directive, which provides directives to the transcoder showing the user's preferred transcoding order, format, etc. The designated transcoder will then retrieve the document from Web content server 30, apply the transformation and send it back to client device 10. The transcoding software in proxy machine 11 is designed to handle dynamic transcoding. To do this, each transcoder stores the document retrieved in browser form for manipulation by each of the desired transformations. As a browser, proxy machine 11 works to separate content, data, and executable script for manipulation by the transcoder in transcoder farm 24. This manipulation is designed to improve the accessibility and usability by the disabled or senior user access in proxy machine 11. The transcoder functions, which are based on the internal browser engine of client device 10, may provide low vision/cognitive transforms, blind transforms, or other transforms.

Other transcoder functions include support for secure connections. Intermediary server 11 may establish a secure socket connection, preferably in the method and system described in U.S. patent application Ser. No. 09/962,000 (now U.S. Pat. No. 6,970,918), to Web content servers 30, and this secure connection may be accessed from client device 10 through a secure or non-secure connection, depending on user preference and set up of proxy machine 11. In addition, transcoder functions may provide access to intermediary web applications 28, which may be mail, settings, bookmarks, history lists, or other features typically associated with a browser. Therefore, in this application, proxy machine 11 acts a proxy browser providing function in intermediary web application 28.

User data base 22 functions primarily to provide user profiles specific for a client. User profiles show client preferences for accessibility display of content, and these profiles are typically conveyed to the transcoder in transcoder 24 through an XML transcode directive. These same user profiles may be passed through intermediary web applications 28, which are then transcoded in transcoder farm 24 according to the user profile.

Referring again now to FIG. 2, as a request is sent from client device 10 to proxy machine 11, the request is sent to Web content server 30 after the client has been authenticated as an authorized user of proxy machine 11. The response is then returned from Web content server 30, typically in HTML format, where it is transcoded in transcoder farm 24 according to a user profile found in user data base 22. The transcoding then applies the appropriate transform, to include those described above for low vision/cognitive disabilities, blindness, and others.

Proxy machine 11 is also able to transcode for device-specific transcoding, such as transcoding content designed in format for a desktop computer into a suitable format, such as WAP, for a PDA. The device-specific transcode can also include the content transformation. For example, content may be magnified for any client device 10 used by the user, whether it is a desktop computer or a PDA. By having a user profile stored in proxy machine 11 that is unique for a user, the user is then able to utilize a variety of client devices 10, by all having access to the user's profile in user data base 22. For example, if the user needs to have image magnified, background removed, and a different display color on a desktop computer, the same user preferences would be automatically applied to any computer used by that user when going through proxy machine 11. Thus the user's own laptop, a borrowed desktop, or a public computer terminal would all display content from any Web site in the same format as defined by that user.

Figure 3:
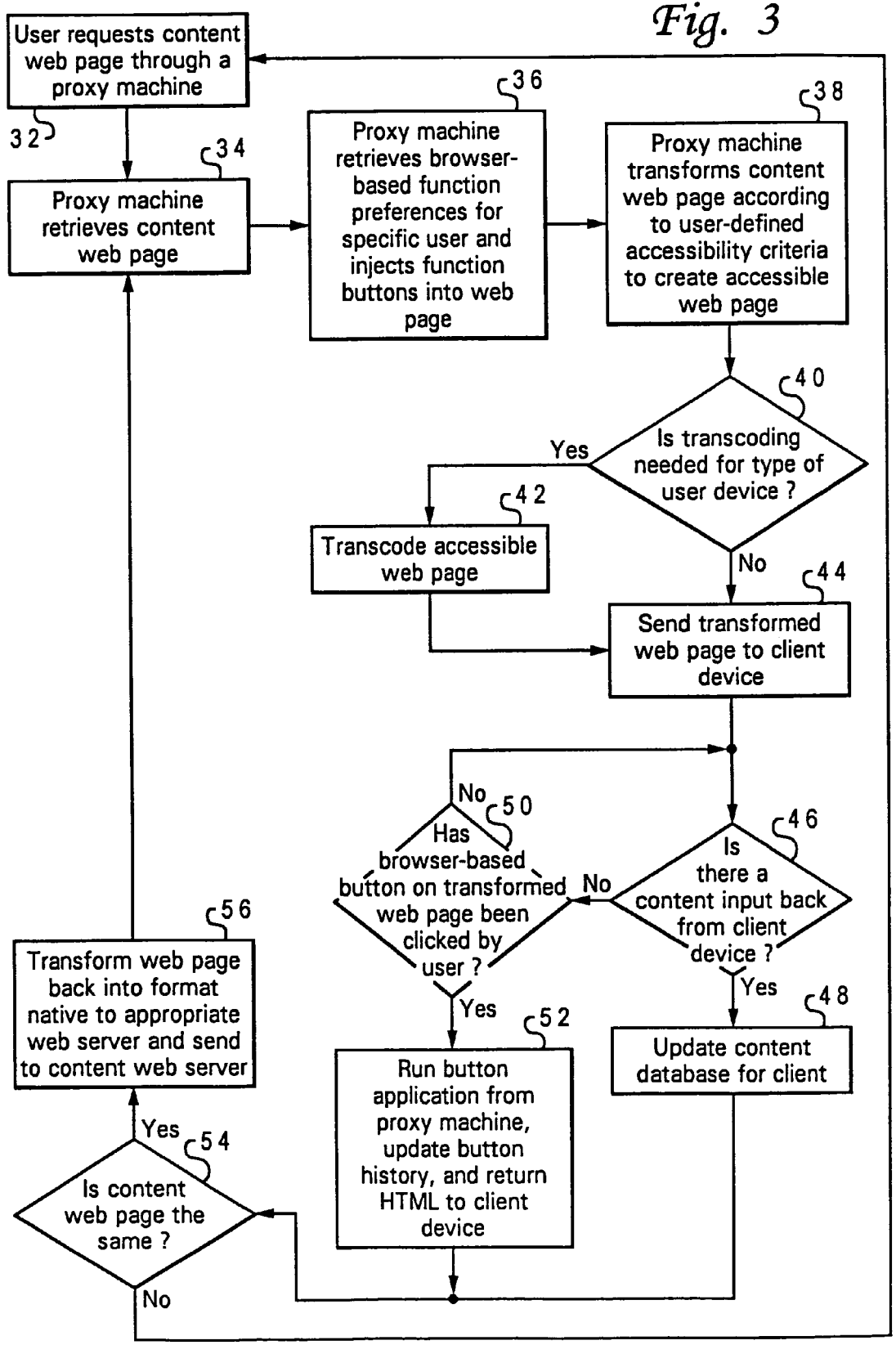
FIG. 3 depicts a high-level flow chat of the preferred embodiment of the invention.

Reference is now made to FIG. 3, a high-level flowchart describing a preferred embodiment of the present invention for injecting browser-based control buttons into any web page. As depicted in block 32, the user first requests a specific content web page by sending the request through proxy machine 11. As illustrated in block 34, proxy machine 11 then retrieves the content web page. Next, as shown in block 36, proxy machine 11 retrieves the browser-based function preferences for the specific user making the web page request, and injects the user selected functions buttons into the retrieved web page. These function buttons 56 (seen in FIG. 4) are links to an application server in proxy machine 11, whose function is described below. As shown in block 38, proxy machine 11 then transforms the content web page according to user-defined accessibility criteria stored in user database 22, which define the user's preferences for content transformations to improve accessibility, such as image magnification, font selection, background, etc. A query, as depicted in block 40, is then made as to whether transcoding is needed to put the content into a format recognizable for the client device 10 in use. For example, HTML content may need to be transcoded into WAP for a PDA. If so, as illustrated in block 42 the transcoding is performed in proxy machine 11 using transcoder farm 24 using directives from user database 22 to control which transcoder applications to run and in which order. The transformed web page is then sent back to client device 10, as depicted in block 44.

Figure 4:
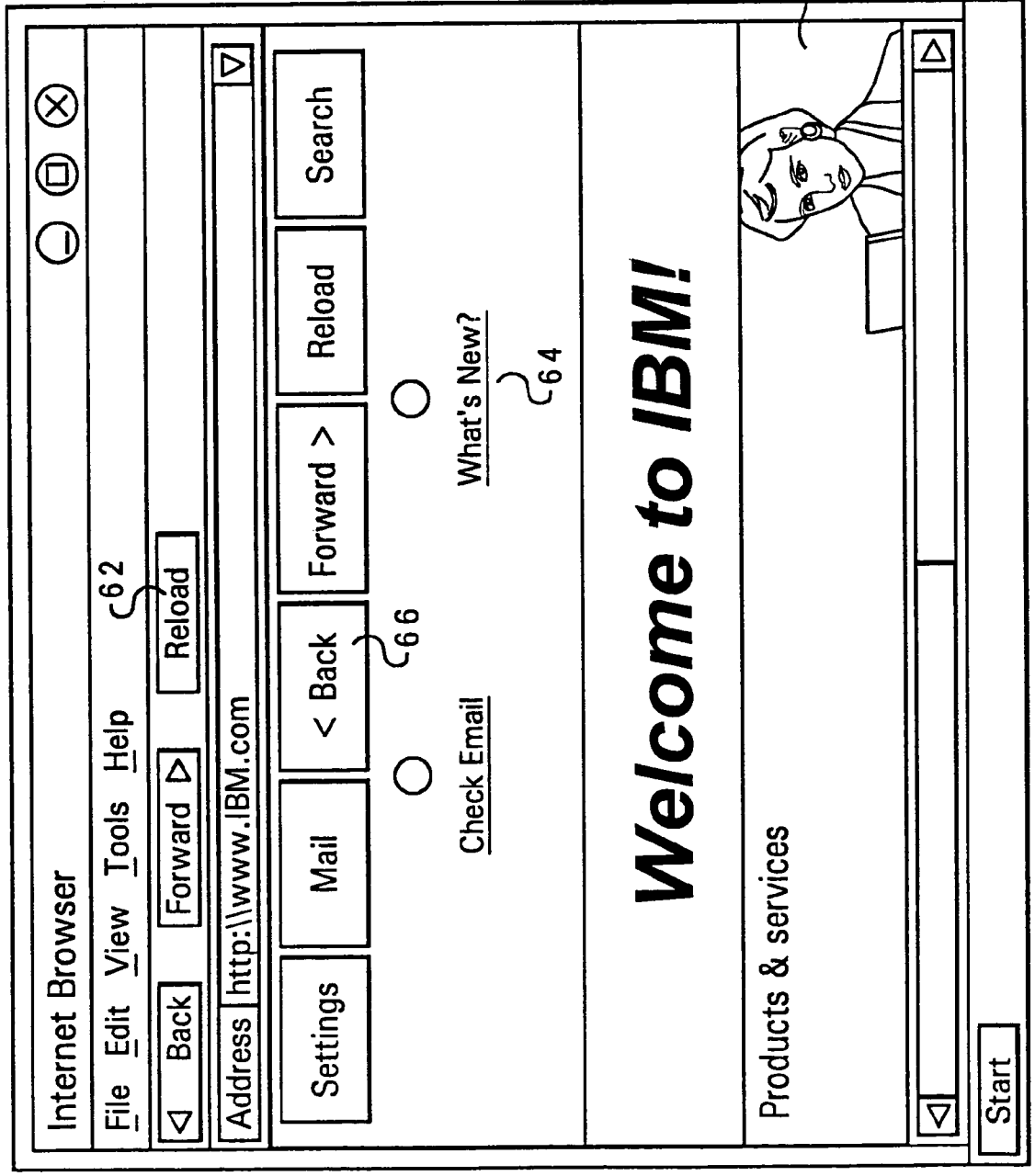
FIG. 4 illustrates an example browser functioning web page.

The transformed web page sent from proxy machine 11 to client device 10 may look like the example shown in FIG. 4. The content screen 60 has been transformed into a format different from that originally retrieved from the web content server. It has been magnified, several unwanted links have been removed while other web page links 64 have been retained. Inserted into content screen 60 are the user-chosen browser-based injected function buttons 66. Some of the buttons 66 replicate browser functions buttons 62 from the Internet browser application on client device 10, such as "Back" and "Forward." Other buttons 66 replicate the functions of buttons from the content web page, such as "Mail." Still other buttons 66 are for functions of proxy machine 11, such as "Settings" for choosing which accessibility transforms are desired by the user. Alternatively or in addition to buttons 66, other browser based function forms, such as form text fields for submitting addresses, may also be injected into content screen 60. Whether in the form of a button 66, form text field or other browser-based function control, all such injected browser-based forms contain at least one element for activating at least one browser based function within content screen 60 to generate a web page that can function as a browser.

Returning now to FIG. 3, after the transformed web page has been sent to client device 10, as shown in block 44, a query is made as to whether the user has entered content input information into the web page, as illustrated in block 46. If so, as shown in block 48, that input is entered into user database 22 for that user for transmission to the content page's content server 16. Likewise, a query, shown in block 50, is made as to whether any of the injected buttons 66 have been clicked by the user. If so, an application running in an application server in proxy machine 11 will update the database and history list for that user, and will then generate HTML code correlating to the web page requested, which is transcoded for client device 10 if necessary, and sent back to client device 10, as depicted in block 52. Clicking an injected button 66 may retrieve a new web page, which query is illustrated in block 54. If so, the new page is treated as a new request shown in block 32. Otherwise, the web page is transformed back into the format understood by content server 16, typically in HTML code, and sent to the content server 16 for that web page, as illustrated in block 56.

Each of the injected browser-based function control forms, whether as a button 66, a form text field, or any other browser-based function form, is supported by a web-based application service for producing web content that is representative of that function. This application service is preferably performed through an intermediary proxy machine 11, and produces the browser-based function, such as requesting a new web page, accessing mail, searching for a document, printing a page, etc.

As has been shown by the description herein, the present invention provides a significant improvement for disabled users and their access to both web content as well as browser functions. By incorporating the browser functions into the web page through user-selected and user-defined browser based accessible function forms, the handicapped user is able to browse content on both a current web page as well as linking or searing for other web pages.

It is understood and appreciated that instructions from a content provider directing that the content provided is not to be transcoded or similarly manipulated should be honored. For example a "no-transform directive" in an HTTP header or similar instructions should be followed, and the content not transcoded or similarly manipulated according to the instructions of the content provider. A description that is illustrative of such an instruction is found in Section 14.9.5 of the 1999 Network Working Group's HyperText Transfer Protocol HTTP/1.1.

While the invention has been particularly shown and described with reference to a preferred embodiment, it will be understood by those killed in the art that various changes in form and detail may be made therein without departing from the spirit and scope of the invention.

What is claimed is:

1. A method for providing browser function accessibility on a web page on a computer network, said method comprising:

connecting a proxy machine between a client device and a web content server;

receiving at the proxy machine a content web page from the web content server requested by the client device;

injecting at least one browser-based function form into the content web page, said at least one browser-based function form activating at least one browser based function to generate a browser functioning web page, wherein the at least one browser-based function form and the content web page are transcoded together for accessibility, and wherein the at least one browser-based function form is a user-defined button that replicates a previously-existing button on the content web page, wherein the user-defined button provides greater user accessibility than the previously-existing button, and wherein the user-defined button is injected by a dedicated transcoder in the proxy machine in accordance with a user data base that describes a visual limitation of a user; and sending the browser functioning web page to the client device.

2. The method of claim 1, wherein said at least one browser based function is supported by a web-based application service in the proxy machine for producing a web content that is representative of the browser-based function.

3. The method of claim 1, further comprising:
   transcoding the browser functioning web page into a format understood by the client device.
4. The method of claim 1, wherein said injecting at least one browser-based function form into the content web page may be blocked by a content provider of the content web page directing that the content web page is not to be transcoded.

5. The method of claim 1, further comprising:
   sending the browser functioning web page to a second client device that is authorized for use by the user with the visual limitation.

* * * * *